(12) United States Patent
Desimone et al.

(10) Patent No.: US 9,189,688 B2
(45) Date of Patent: Nov. 17, 2015

(54) IDENTIFYING SPATIAL LOCATIONS OF EVENTS WITHIN VIDEO IMAGE DATA

(71) Applicant: International Business Machines Corporation, Armonk, NY (US)

(72) Inventors: Michael J. Desimone, Ridgefield, CT (US); Arun Hampapur, Norwalk, CT (US); Zuoxuan Lu, Yorktown Heights, NY (US); Carl P. Mercier, New Milford, CT (US); Christopher S. Milite, Oxford, CT (US); Stephen R. Russo, Southbury, CT (US); Chiao-Fe Shu, Scarsdale, NY (US); Chek K. Tan, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/595,726

(22) Filed: Jan. 13, 2015

(65) Prior Publication Data

US 2015/0161453 A1    Jun. 11, 2015

Related U.S. Application Data

(63) Continuation of application No. 13/903,237, filed on May 28, 2013, now Pat. No. 8,971,580, which is a continuation of application No. 12/407,499, filed on Mar. 19, 2009, now Pat. No. 8,537,219.

(51) Int. Cl.
G06K 9/00 (2006.01)

(52) U.S. Cl.
CPC ........ *G06K 9/00771* (2013.01); *G06K 9/00335* (2013.01); *G06K 9/00711* (2013.01)

(58) Field of Classification Search
CPC .......... G06K 9/00335; G06K 9/00771; G06K 9/00711; G06K 9/481; H04N 7/18
USPC .................................................. 382/103, 107
See application file for complete search history.

(56) References Cited

U.S. PATENT DOCUMENTS 6,198,850 B1    3/2001 Banton
6,418,424 B1    7/2002 Hoffberg et al.
(Continued)

OTHER PUBLICATIONS

Dimitrova, Nevenka and Golshani, Forouzan, "Motion Recovery for Video Content Classification", ACM Transactions on Information Systems, vol. 13, No. 4, Oct. 1995, pp. 408-439.
(Continued)

*Primary Examiner* — Tom Y Lu
(74) *Attorney, Agent, or Firm* — Maeve L. Mccarthy; Keohane & D'Alessandro PLLC; Hunter E. Webb (57) ABSTRACT

An invention for identifying a spatial location of an event within video image data is provided. Disclosed are embodiments for detecting an object and obtaining trajectory data of a trajectory of the object within the video image data from a sensor device; converting the trajectory data into a contour-coded compressed image; generating, based on the trajectory data, a searchable code that contains a set of locations traversed by the trajectory of the object within the video image; associating the searchable code with the contour-coded compressed image in a database; and returning, in response to a query having a selected location that corresponds a location of the set of locations in the searchable code, an image of the trajectory data corresponding to the object based on the contour-coded compressed image in the database.

20 Claims, 7 Drawing Sheets

(56) References Cited

U.S. PATENT DOCUMENTS

| | | |
|---|---|---|
| 6,757,008 B1 | 6/2004 | Smith |
| 6,879,266 B1 | 4/2005 | Dye et al. |
| 7,030,905 B2 | 4/2006 | Carlbom et al. |
| 7,072,398 B2 | 7/2006 | Ma |
| 7,088,846 B2 | 8/2006 | Han et al. |
| 7,143,083 B2 | 11/2006 | Carlbom et al. |
| 7,165,112 B2 | 1/2007 | Battin et al. |
| 7,190,284 B1 | 3/2007 | Dye et al. |
| 7,263,472 B2 | 8/2007 | Porikli |
| 7,444,003 B2 | 10/2008 | Laumeyer et al. |
| 7,542,588 B2 | 6/2009 | Ekin et al. |
| 7,801,328 B2 | 9/2010 | Au et al. |
| 7,868,912 B2 | 1/2011 | Venetianer et al. |
| 7,961,946 B2 | 6/2011 | Hammadou |
| 8,131,012 B2 | 3/2012 | Eaton et al. |
| 2002/0105529 A1 | 8/2002 | Bowser et al. |
| 2003/0023595 A1 | 1/2003 | Carlbom et al. |
| 2003/0025599 A1 | 2/2003 | Monroe |
| 2003/0063670 A1 | 4/2003 | Masukura et al. |
| 2004/0194129 A1 | 9/2004 | Carlbom et al. |
| 2006/0036695 A1 | 2/2006 | Rolnik |
| 2006/0056518 A1 | 3/2006 | Conklin |
| 2006/0062478 A1 | 3/2006 | Cetin et al. |
| 2006/0187305 A1 | 8/2006 | Trivedi et al. |
| 2006/0279630 A1 | 12/2006 | Aggarwal et al. |
| 2007/0190990 A1 | 8/2007 | Yin |
| 2007/0257986 A1 | 11/2007 | Ivanov et al. |
| 2007/0260809 A1* | 11/2007 | Hara et al. ............ 711/101 |
| 2008/0120558 A1 | 5/2008 | Nathan et al. |
| 2008/0129844 A1 | 6/2008 | Cusack et al. |
| 2008/0195713 A1 | 8/2008 | Benschop et al. |
| 2008/0252723 A1 | 10/2008 | Park |
| 2009/0055484 A1 | 2/2009 | Vuong et al. |
| 2009/0210505 A1 | 8/2009 | Thomas et al. |
| 2010/0239016 A1 | 9/2010 | Desimone et al. |
| 2011/0041181 A1 | 2/2011 | Niccolini et al. |
| 2011/0096149 A1 | 4/2011 | Au et al. |
| 2012/0207387 A1 | 8/2012 | Pereira et al. |

OTHER PUBLICATIONS

Tian, Ying-Ii, et al, "Event Detection, Query, and Retrieval for Video Surveillance", Artificial Intelligence for Maximizing Content Based Image Retrieval, Chapter XV, pp. 342-370.

Luciano da Fontoura Costa and Roberto Marcondes Cesar Jr., "Shape Analysis and Classification", CRC Press, 2001.

Maytham H. Safar and Cyrus Shahabi, "Shape Analysis and Retrieval of Multimedia Objects", Kluwer Academic Publishers, 2003.

Communication Relating to the Results of the Partial International Search, PCT/EP2010/052636, mailed Sep. 14, 2010.

International Search Report, PCT/EP2010/052636, mailed Dec. 29, 2010.

Ziliani, F. et al., "Effective integration of object tracking in a video coding scheme for multisensor surveillance systems," Proceedings of the 2002 International Conference on Image Processing, Rochester, New York, Sep. 22-25, pp. 521-524.

Muktesh G. Gupta, USPTO Office Action, U.S. Appl. No. 12/407,499, Mail Date Oct. 26, 2011, 17 pages.

Muktesh G. Gupta, USPTO Final Office Action, U.S. Appl. No. 12/407,499, Mail Date Sep. 19, 2012, 13 pages.

Djenane M. Bayard, USPTO Notice of Allowance and Fee(s) Due, U.S. Appl. No. 12/407,499, Date Mailed Jan. 18, 2013, 13 pages.

Luis M. Perez, USPTO Office Action, U.S. Appl. No. 12/407,520, Mail Date Aug. 4, 2011, 17 pages.

Luis M. Perez, USPTO Final Office Action, U.S. Appl. No. 12/407,520, Mail Date Oct. 25, 2011, 19 pages.

Luis M. Perez, USPTO Office Action, U.S. Appl. No. 12/407,520, Mail Date Sep. 13, 2012, 14 pages.

Tom Y. Lu, USPTO Notice of Allowance, U.S. Appl. No. 13/903,237, Mail Date Oct. 27, 2014, 15 pages.

Carlton Johnson, USPTO Office Action, U.S. Appl. No. 14/161,841, Notification Date Apr. 27, 2015, 29 pages.

* cited by examiner

36 Bit code

IDENTIFYING SPATIAL LOCATIONS OF EVENTS WITHIN VIDEO IMAGE DATA

CROSS-REFERENCE TO RELATED APPLICATIONS

The present patent document is a continuation of U.S. Pat. No. 8,537,219, issued Sep. 17, 2013, and co-pending U.S. patent application Ser. No. 13/903,237, filed May 28, 2013, both entitled "IDENTIFYING SPATIAL LOCATIONS OF EVENTS WITHIN VIDEO IMAGE DATA", the disclosures of which are incorporated herein by reference. This application is also related in some aspects to the commonly owned U.S. Pat. No. 8,553,778, issued Oct. 8, 2013, entitled "CODING SCHEME FOR IDENTIFYING LOCATIONS OF EVENTS WITHIN VIDEO IMAGE DATA," and U.S. patent application Ser. No. 14/041,304, filed Sep. 3, 2013, entitled "CODING SCHEME FOR IDENTIFYING LOCATIONS OF EVENTS WITHIN VIDEO IMAGE DATA, the entire contents of which are herein incorporated by reference.

FIELD OF THE INVENTION

The present invention generally relates to video surveillance, and more specifically to spatial surveillance event searching.

BACKGROUND OF THE INVENTION

Large surveillance networks that are deployed on buildings, highways, trains, metro stations, etc., integrate a large number of cameras, sensors, and information. Human operators typically cannot adequately control and monitor all the cameras within a large surveillance system. As such, many prior art approaches involve object detection and tracking techniques to identify and analyze events occurring within a camera field of view. However, when it comes to searching through large amounts of video data in an effort to identify an event within video image data, it is difficult to obtain reliable results.

For example, consider a surveillance camera that is monitoring a long-term parking lot. The parking lot attendant receives a complaint that a car has been vandalized at some point in the past month. The prior art requires either a manual review of tapes/files from the video camera for the entire month, or the use of a query box drawn around the particular parking spot with the surveillance system retrieving all movement that occurred in the query box. The first approach is typically ineffective because an operator or group of operators must review hundreds of hours of video to observe an event that may have lasted a few seconds. The second approach uses automatic video object tracking and meta-data indexing using a standard relational database to support spatial queries. However, the drawback of this approach is that the representation of the meta-data is very voluminous and makes the indexing of large numbers of cameras impractical due to the heavy volume of network traffic and the size of database tables created.

SUMMARY OF THE INVENTION

In one embodiment, there is a method for identifying a spatial location of an event within video image data comprising: detecting an object and obtaining trajectory data of a trajectory of the object within the video image data from a sensor device; converting the trajectory data into a contour-coded compressed image; generating, based on the trajectory data, a searchable code that contains a set of locations traversed by the trajectory of the object within the video image; associating the searchable code with the contour-coded compressed image in a database; and returning, in response to a query having a selected location that corresponds a location of the set of locations in the searchable code, an image of the trajectory data corresponding to the object based on the contour-coded compressed image in the database.

In a second embodiment, there is system for identifying a spatial location of an event within video image data comprising: at least one processing device; memory operably associated with the at least one processing device; and a spatial representation tool storable in memory and executable by the at least one processing device, the spatial representation tool causing the at least one processing device to: detect an object and obtaining trajectory data of a trajectory of the object within the video image data from a sensor device; convert the trajectory data into a contour-coded compressed image; generate, based on the trajectory data, a searchable code that contains a set of locations traversed by the trajectory of the object within the video image; associate the searchable code with the contour-coded compressed image in a database; and return, in response to a query having a selected location that corresponds a location of the set of locations in the searchable code, an image of the trajectory data corresponding to the object based on the contour-coded compressed image in the database.

In a third embodiment, there is a computer-readable storage device storing computer instructions, which when executed, enables a computer system to identify a spatial location of an event within video image data, the computer instructions comprising: detecting an object and obtaining trajectory data of a trajectory of the object within the video image data from a sensor device; converting the trajectory data into a contour-coded compressed image; generating, based on the trajectory data, a searchable code that contains a set of locations traversed by the trajectory of the object within the video image; associating the searchable code with the contour-coded compressed image in a database; and returning, in response to a query having a selected location that corresponds a location of the set of locations in the searchable code, an image of the trajectory data corresponding to the object based on the contour-coded compressed image in the database.

In a fourth embodiment, there is a method for deploying a spatial representation tool that identifies a spatial location of an event within video image data in a networked computing environment. In this embodiment, the method comprises a providing a computer infrastructure having at least one computing device that operates to: detect an object and obtaining trajectory data of a trajectory of the object within the video image data from a sensor device; convert the trajectory data into a contour-coded compressed image; generate, based on the trajectory data, a searchable code that contains a set of locations traversed by the trajectory of the object within the video image; associate the searchable code with the contour-coded compressed image in a database; and return, in response to a query having a selected location that corresponds a location of the set of locations in the searchable code, an image of the trajectory data corresponding to the object based on the contour-coded compressed image in the database.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to searching large numbers of surveillance camera events using relational database tables based on the location of an event within a camera field of view. In these embodiments, a spatial representation tool provides this capability. Specifically, the spatial representation tool comprises elements configured to detect an object and obtain trajectory data of a trajectory of the object within the video image data from a sensor device; convert the trajectory data into a contour-coded compressed image; generate, based on the trajectory data, a searchable code that contains a set of locations traversed by the trajectory of the object within the video image; associate the searchable code with the contour-coded compressed image in a database; and return, in response to a query having a selected location that corresponds a location of the set of locations in the searchable code, an image of the trajectory data corresponding to the object based on the contour-coded compressed image in the database.

Figure 1:
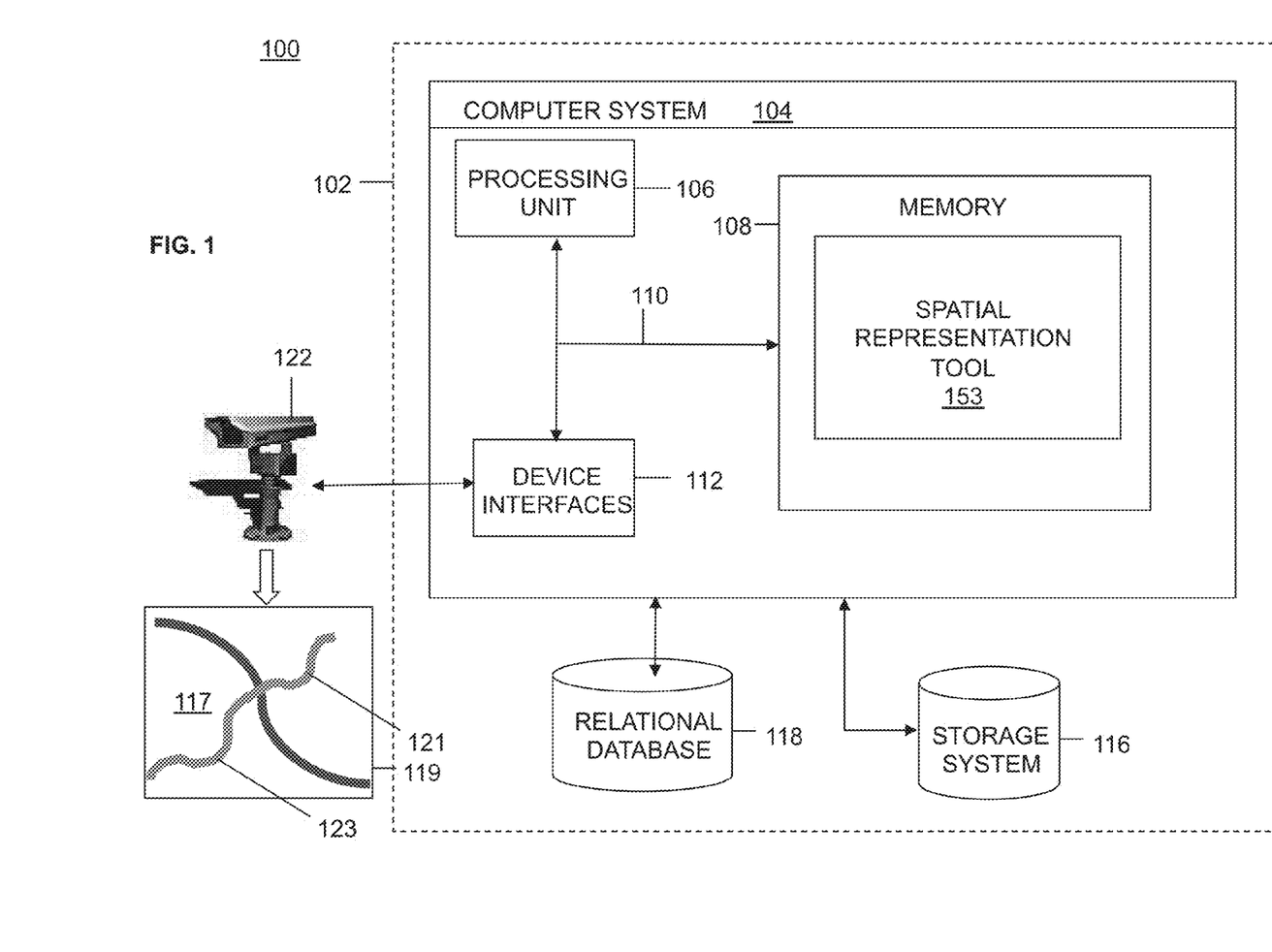
FIG. 1 shows a schematic of an exemplary computing environment in which elements of the present invention may operate.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for generating a coding scheme for identifying a spatial location of an event within video image data. It should be understood that any other computers implemented under the present invention may have different components/software, but will perform similar functions. As shown, computer system 104 includes a processing unit 106 capable of analyzing sensor data, and producing a usable output, e.g., compressed video and video meta-data. Also shown is memory 108 for storing a spatial representation tool 153, a bus 110, and device interfaces 112.

Computer system 104 is shown communicating with a sensor device 122 that communicates with bus 110 via device interfaces 112. Sensor device 122 (or multiple sensor devices) includes sensor devices for capturing image data representing objects and visual attributes of moving objects (e.g., people, cars, animals, products, etc.) within a camera view 119 from sensor device 122, including trajectory data 121 and 123 (i.e., paths of events/objects within video image data 119). Sensor device 122 can include virtually any type of sensor capable of capturing visual attributes of objects, such as, but not limited to: optical sensors, infrared detectors, thermal cameras, still cameras, analog video cameras, digital video cameras, or any other similar device that can generate sensor data of sufficient quality to support the methods of the invention as described herein.

Processing unit 106 collects and routes signals representing outputs from sensor devices 122 to spatial representation tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, sensor device 122 is capable of two-way communication, and thus can receive signals (to power up, to sound an alert, etc.) from spatial representation tool 153.

In general, processing unit 106 executes computer program code, such as program code for operating spatial representation tool 153, which is stored in memory 108 and/or storage system 116. While executing computer program code, processing unit 106 can read and/or write data to/from memory 108 and storage system 116 and a relational database 118. Relational database 118 stores sensor data, including video metadata generated by processing unit 106, as well as rules against which the metadata is compared to identify objects and trajectories of objects present within video image data 119. As will be further described herein, relational database 118 stores trajectory data 117 on each of trajectories 121 and 123, along with corresponding coding information for efficient querying. It will be appreciated that storage system 116 and relational database 118 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, but not limited to, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

Figure 2:
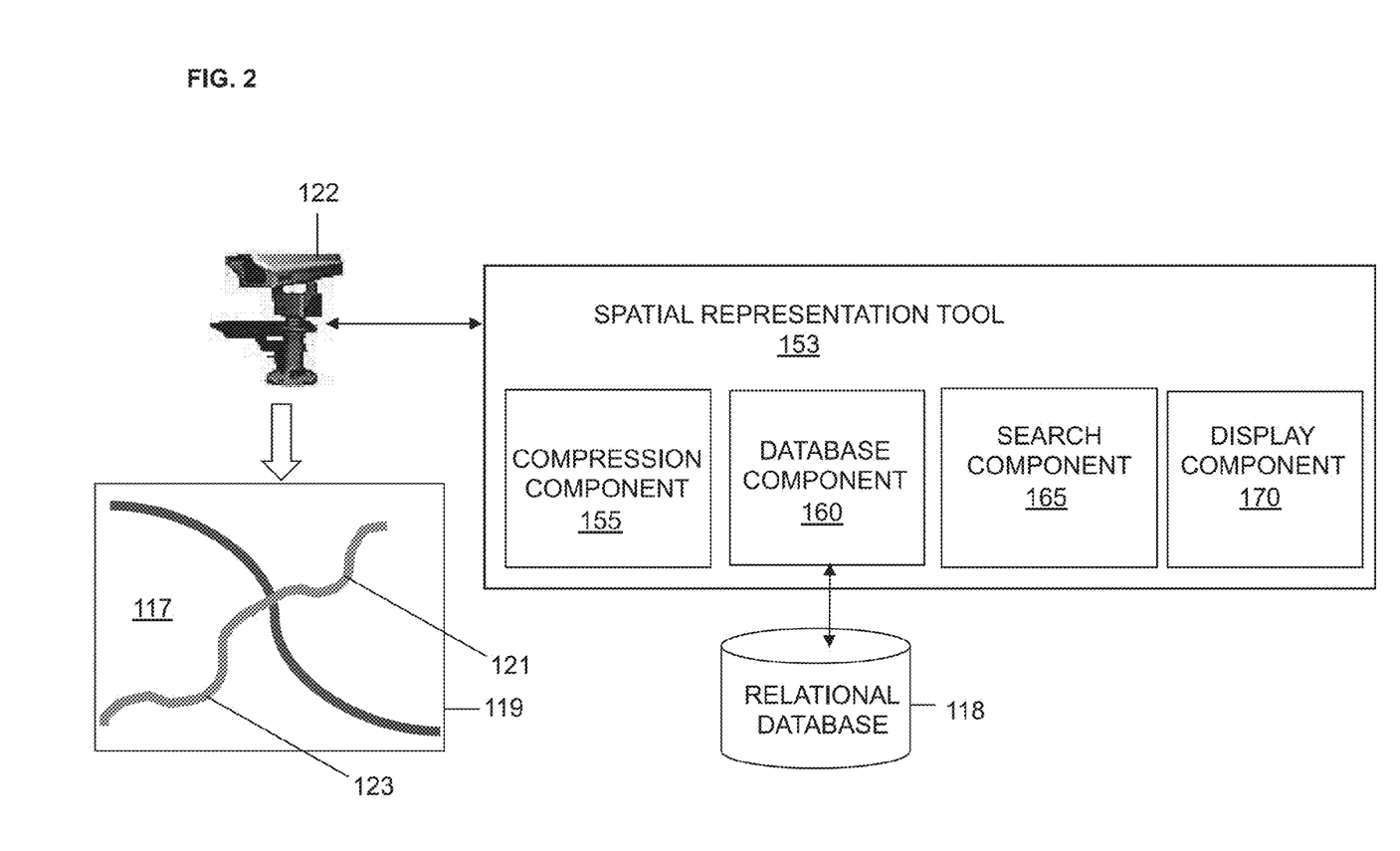
FIG. 2 shows a spatial representation tool that operates in the environment shown in FIG. 1.

FIG. 2 shows a more detailed view of spatial representation tool 153 according to embodiments of the invention. As shown, spatial representation tool 153 comprises a compression component 155 configured to receive trajectory data 117 of an event within video image data 119 (e.g., object and track data from sensor device 122). Compression component 155 processes trajectory data 117 from sensor device 122 in real-time, identifying objects and trajectories of objects that are detected in video image data 119. Compression component 155 provides the software framework for hosting a wide range of video analytics to accomplish this. The video analytics are intended to detect and track objects moving across a field of view and perform an analysis of tracking data associated with each object. The set of moving objects can be detected using a number of approaches, including but not limited to: background modeling, object detection and tracking, spatial intensity field gradient analysis, diamond search block-based (DSBB) gradient descent motion estimation, or any other method for detecting and identifying objects captured by a sensor device.

Figure 3:
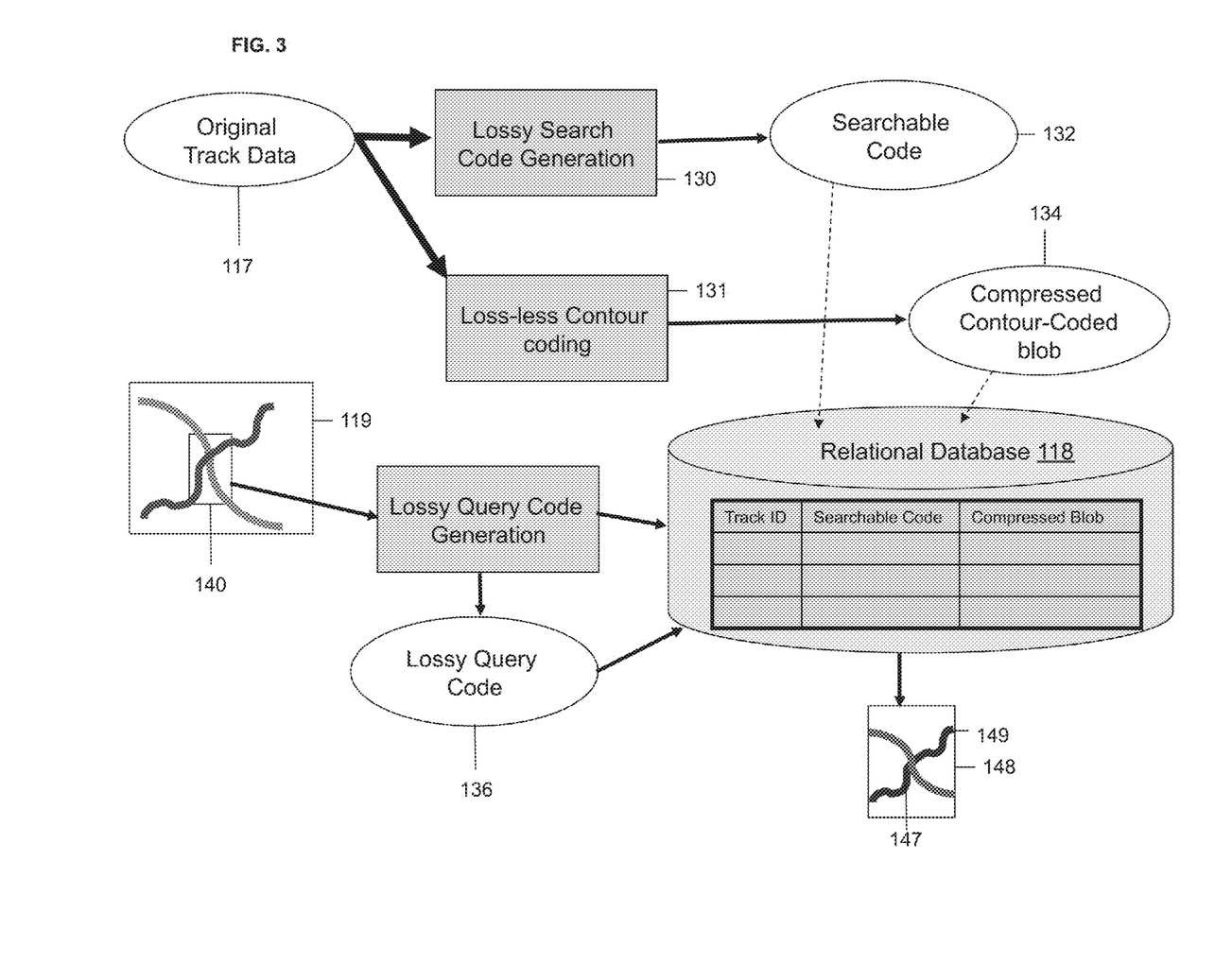
FIG. 3 shows a system for searching within video image data according to embodiments of the invention.

As shown in FIGS. 2-3, compression component 155 is configured to receive trajectory data 117 of video image data 119 and generate a set (i.e., one or more) of compressed spatial representations (132, 134) of trajectory data 117 of the event within video image data 119. In an exemplary embodiment, compression component 155 generates multiple compressed spatial representations of the video image data 117 using different data compression techniques. For example, as shown in FIG. 3, both a lossy search code and a lossless contour code are generated to encode the trajectory of each event with video image data 119, as will be further described below. Compression component 155 is configured to generate a searchable code 132 of trajectory data 117 of the event within video image data 119, and a compressed contour-coded blob 134 of trajectory data 117 of the event within video image data 119.

Next, both searchable code 132 and compressed contour-coded blob 134 are stored within relational database 118, along with the corresponding track ID, for subsequent retrieval. As shown in FIG. 2, spatial representational tool 153 comprises a database component 160 configured to input searchable code 132 of trajectory data 117 of the event within video image data 119 and compressed contour-coded blob 134 of trajectory data 117 of the event within video image data 119 into relational database 118. In one embodiment, database component 160 generates and uploads messages in extensible mark-up language (XML) to relational database 118 including Track ID, search code represented as a CHAR String, and contour code packaged as a proprietary file with binary representation.

During operation, retrieval may occur when a user that is monitoring video image data 119 wishes to investigate an event (e.g., a person, a security breach, a criminal act, suspicious activity, etc.). As shown in FIGS. 2-3, spatial representation tool 153 comprises a search component 165 configured to search relational database 118 to identify a spatial location of the event within video image data 119. Specifically, search component 165 is configured to specify a region of interest 140 (FIG. 3) within video image data 119. This selection may be performed by the user monitoring video image data 119, e.g., via a pointing device (not shown). Search component 165 then converts region of interest 140 to a lossy query code 136 and performs a database search of relational database 118. Specifically, search component 165 compares lossy query code 136 to searchable code 132 of trajectory data 117 of the event within video image data 119. In one embodiment, each row of relational database 118 is evaluated using a 'UDF→Function' for performing 'BITWISE AND' between lossy query code 136 and searchable code 132 corresponding to each track in the table. All rows that intersect region of interest 140 are returned as part of the result set to identify the spatial location of the event.

The result set is then typically returned to the user as a display 148 (e.g., via a graphical user interface). To accomplish this, spatial representation tool 153 comprises a display component 170 (FIG. 2) configured to decompress contour-coded blob 134 corresponding to lossy query code 136 based on the comparison of lossy query code 136 to searchable code 132 of trajectory data 117 of the event within video image data 119. Contour-coded blob 134 is converted back to the original version of trajectory data 117 and displayed on display 148. Display component 170 plots a trajectory (147, 149) of the event within video image data 119 to identify the spatial location of the event.

Figure 4:
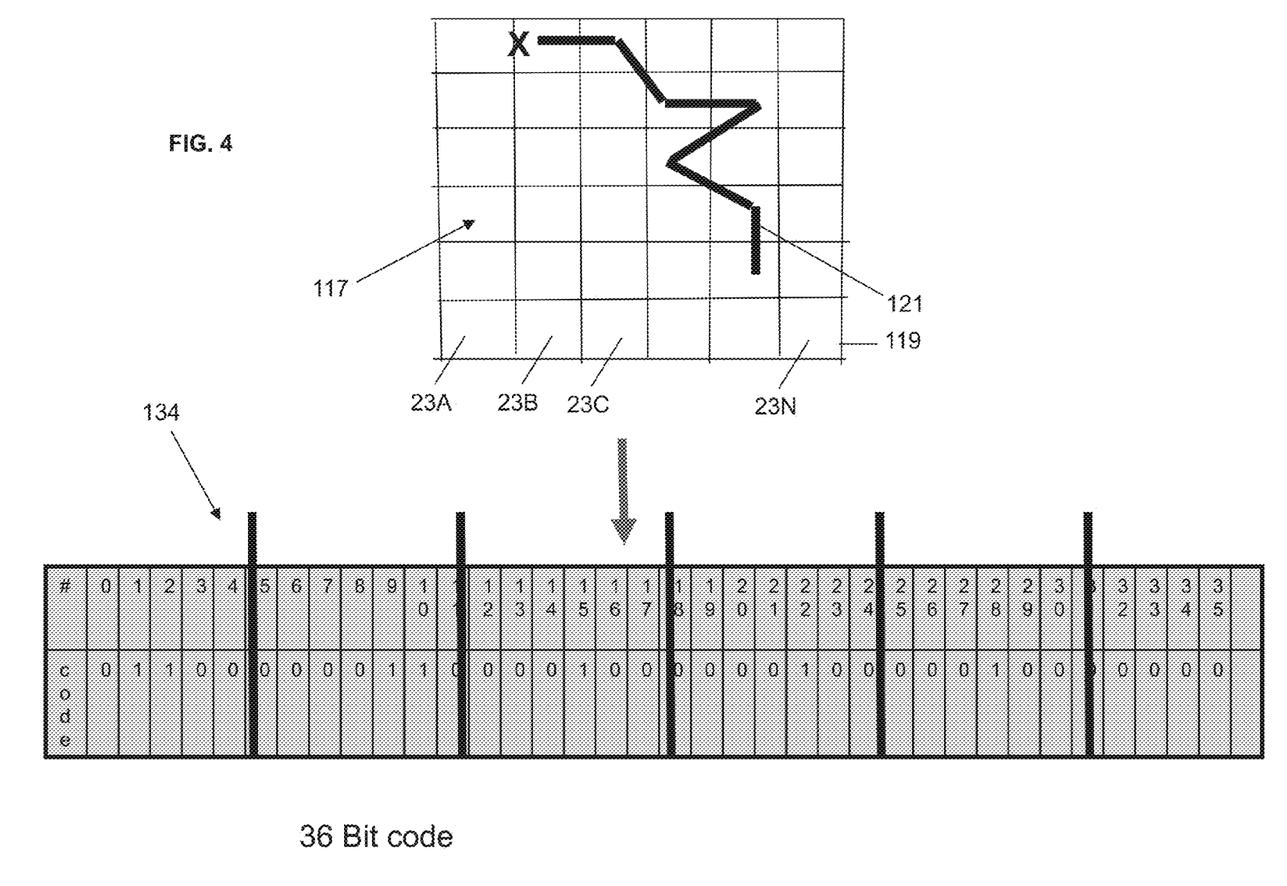
FIG. 4 shows an approach for lossless contour coding generation according to embodiments of the invention.

Referring now to FIGS. 3-6, an approach for generating a set of compressed spatial representations of trajectory data 117 of the event within video image data 119 will be described in further detail. As mentioned above, compression component 155 (FIG. 2) is configured to generate a searchable code 132 of trajectory data 117 of the event within video image data 119, and a compressed contour-coded blob 134 of trajectory data 117 of the event within video image data 119. As shown in FIG. 4, in the first case, compression component 150 is configured to receive track data 117 of event "X" (e.g., a person, a security breach, a criminal act, suspicious activity, etc.) within video image data 119, and generate a contour-coded blob 134 from lossless contour code 131 (FIG. 3) to encode trajectory 121 of event "X". To accomplish this, compression component divides video image data 119 into a plurality of pixel regions 23A, 23B, 23C, . . . 23N, and determines whether each of plurality of pixel regions 23A-23N contains track data 117. That is, each pixel is analyzed to determine if trajectory 121 intersects the pixel. If yes, a '1' is entered into 36 bit contour-coded blob 134. If trajectory 121 does not intersect the pixel, '0' is entered. This process is repeated until contour-coded blob 134 is complete and it is entered into relational database 118.

Figure 5:
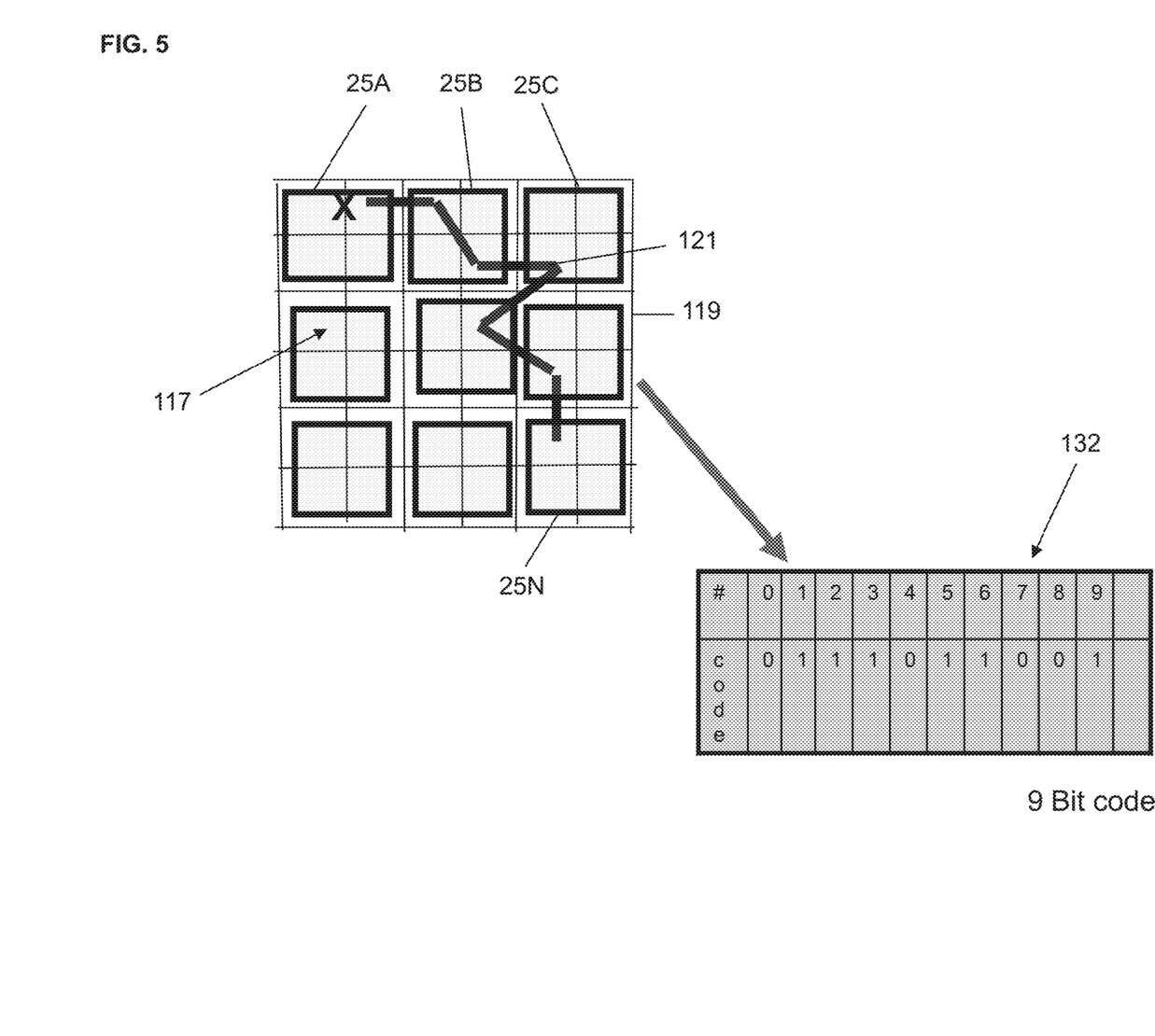
FIG. 5 shows an approach for lossy search code generation according to embodiments of the invention.

Next, as shown in FIG. 5, a searchable code 132 of trajectory data 117 of the event within video image data 119 is generated. To accomplish this, compression component 155 is configured to divide video image data 119 into a second plurality of pixel regions 25A, 25B, 25C, . . . 25N. As shown, second plurality of pixel regions 25A-25N comprises less pixel regions than plurality of pixel regions 23A-23N for contour-coded blob 134. In this case, the 6×6 representation of video image data 119 is quantized into a 3×3 image, thus generating 9 bit searchable code 132. Once again, to encode track data 117, it is determined whether each of second plurality of pixel regions 25A-25N contains track data 117. That is, each pixel is analyzed to determine if trajectory 121 intersects the pixel. If trajectory 121 intersects, a '1' is entered into 9 bit searchable code 132. If trajectory 121 does not intersect the pixel, a '0' is entered. This process is repeated until searchable code 132 is formed, and searchable code 132 is then entered into relational database 118 to enable rapid searching.

Figure 6:
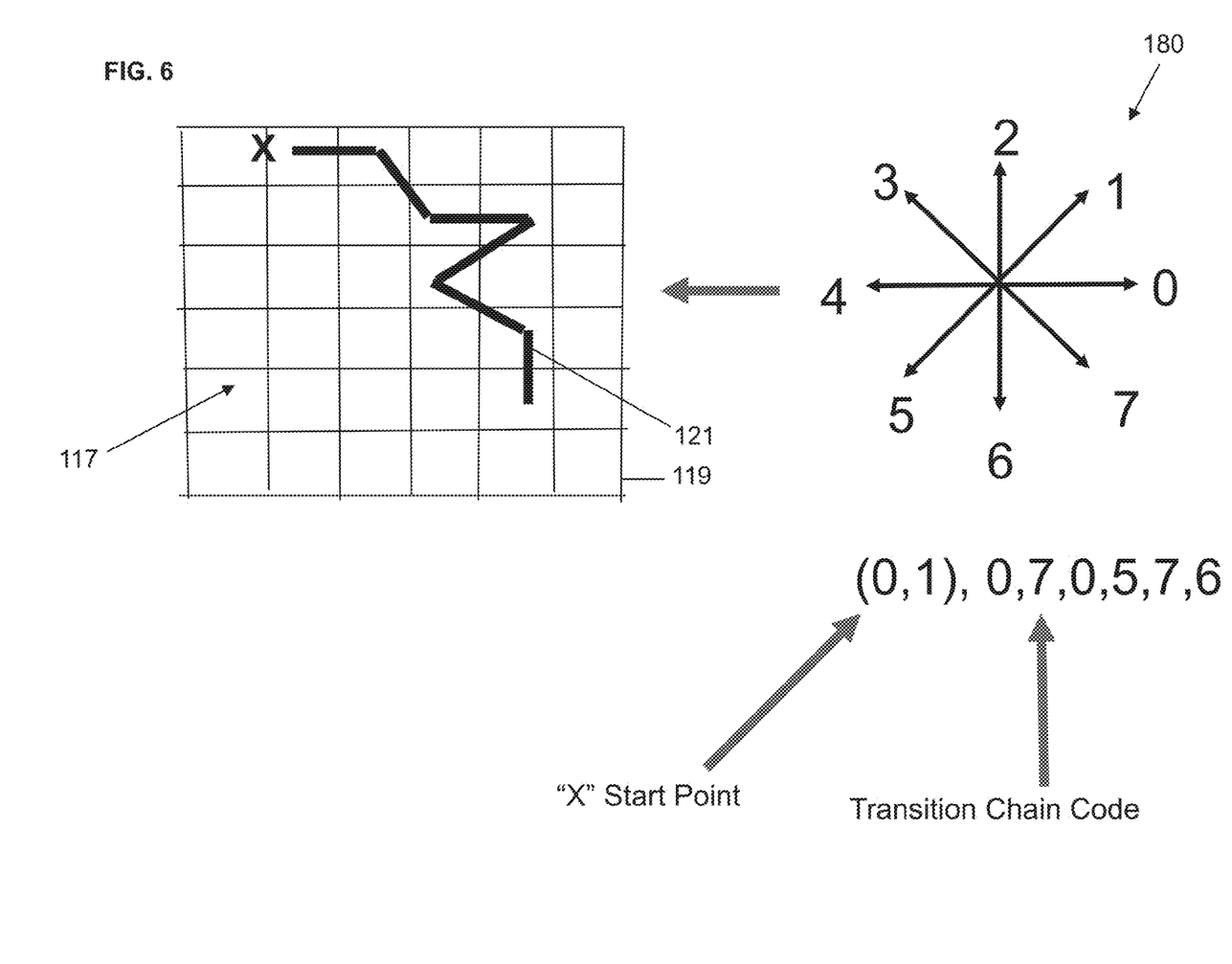
FIG. 6 shows an approach for identifying an event within the video image data according to embodiments of the invention.

Next, as shown in FIG. 6, trajectory data 117 of trajectory 121 is more precisely analyzed. In this embodiment, video image data 119 is analyzed using an 8-point neighborhood scan 180 to generate the transition chain code. As shown, event "X" starts at point (0,1), and the direction of trajectory 121 is plotted according to 8-point neighborhood scan 180. This embodiment allows increased specificity over the 6×6 image shown in FIG. 4. Rather than simply identifying whether trajectory 121 is present within each pixel, 8-point neighborhood scan provides information on a direction of trajectory 121 within each pixel. It will be appreciated that the precision may be adjusted by increasing or decreasing the number of points in the neighborhood scan.

It can be appreciated that the methodologies disclosed herein can be used within a computer system to identify a spatial location of an event within video image data, as shown in FIG. 1. In this case, spatial representation tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable storage device; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 7:
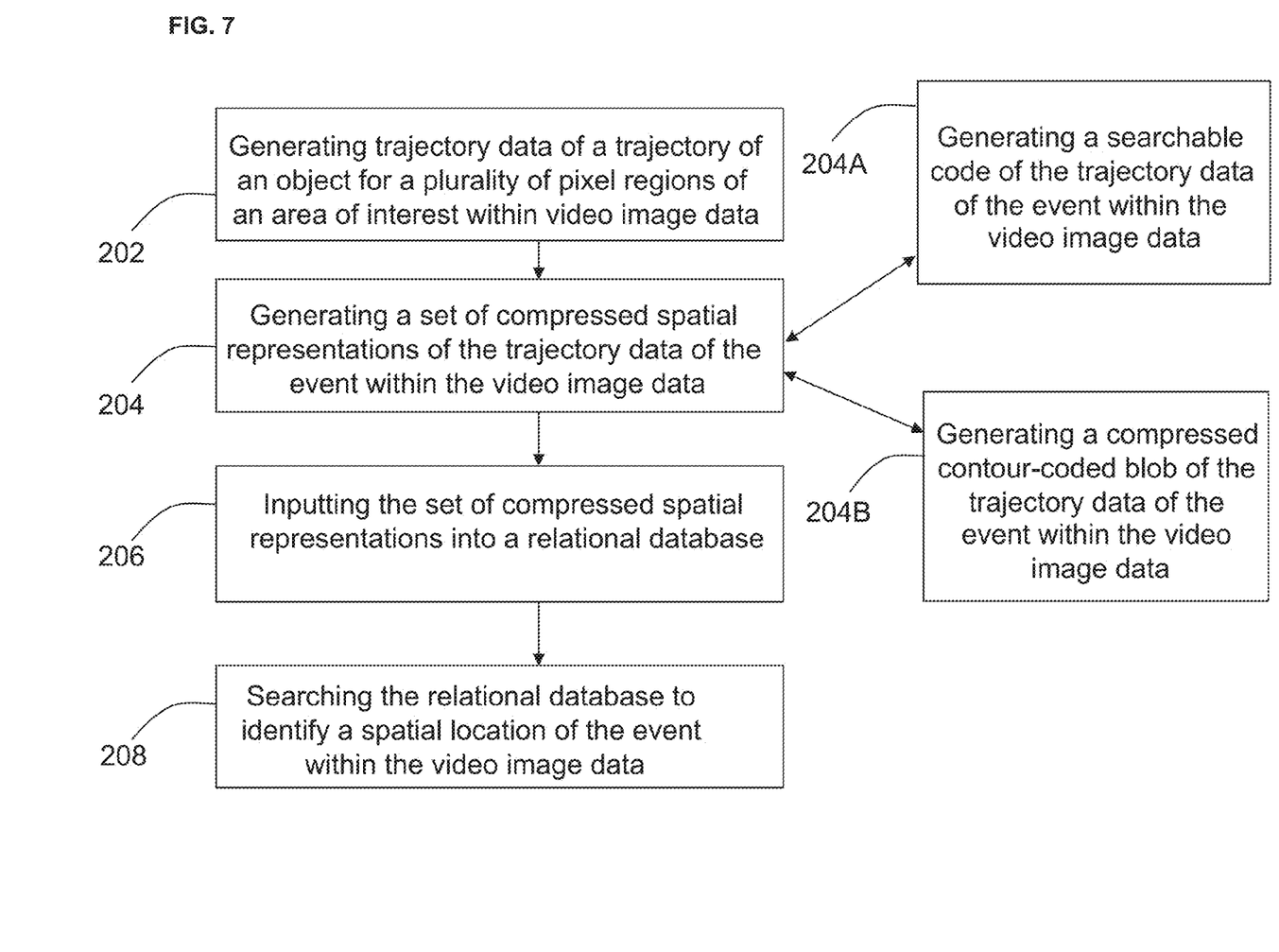
FIG. 7 shows a flow diagram of a method for searching within the video image data according to embodiments of the invention.

The program modules carry out the methodologies disclosed herein, as shown in FIG. 7. According to one embodiment, at 202, trajectory data of a trajectory of an object for a plurality of pixel regions of an area of interest within video image data is generated. At 204, a set of compressed spatial representations of the trajectory data of the event within the video image data is generated. At 204A, a searchable code of the trajectory data of the event within the video image is generated. At 204B, a compressed contour-coded blob of the trajectory data of the event within the video image data is generated. At 206, the set of compressed spatial representations is input into a relational database. At 208, the relational database is searched to identify a spatial location of the event within the video image data.

The flowchart of FIG. 7 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 (FIG. 1) may be stored on or transmitted across some form of non-transitory computer readable media. Computer readable media can be any available media that can be accessed by a computer. By way of example, and not limitation, computer readable media may comprise "computer storage device" and "communications media."

"Computer storage device" include volatile and non-volatile, removable and non-removable media implemented in any method or technology for storage of information such as computer readable instructions, data structures, program modules, or other data. Computer storage devices includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for identifying a spatial location of an event within video image data. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for identifying a spatial location of an event within video image data comprising:
    detecting, by at least one computer device, an object and obtaining trajectory data of a trajectory of the object within the video image data from a sensor device;
    converting, by the at least one computer device, the trajectory data into a contour-coded compressed image;
    generating, by the at least one computer device based on the trajectory data, a searchable code that contains a set of locations traversed by the trajectory of the object within the video image;
    associating, by the at least one computer device, the searchable code with the contour-coded compressed image in a database; and
    returning, by the at least one computer device in response to a query having a selected location that corresponds a location of the set of locations in the searchable code, an image of the trajectory data corresponding to the object based on the contour-coded compressed image in the database.

2. The method according to claim 1, further comprising searching the database to identify a spatial location of the event within the video image data.

3. The method according to claim 2, the searching comprising:
    converting the area of interest to a lossy query code; and
    comparing the lossy query code to the searchable code of the trajectory data within the video image data.

4. The method according to claim 3, further comprising:
decompressing the contour-coded compressed image corresponding to the lossy query code based on the comparing; and
plotting the trajectory of the trajectory data within the video image data from the contour-coded compressed image.

5. The method according to claim 1, wherein the converting further comprises:
dividing the video image data into a plurality of pixel regions;
determining, for each pixel region in the plurality of pixel regions, whether the trajectory intersects any pixel in the pixel region; and
indicating, for each pixel region, a result of the determining in a memory location in the contour-coded compressed image that corresponds to the pixel region.

6. The method according to claim 5, the converting further comprising:
determining, for each pixel region that the trajectory intersects, a direction of the trajectory from a location in the video image associated with the pixel region; and
assigning a value that indicates the direction of the trajectory from the associated location to the memory location in the contour-coded compressed image that corresponds to each pixel region that the trajectory intersects.

7. The method according to claim 1, wherein the generating further comprises:
dividing the video image data into a plurality of pixel regions;
determining, for each pixel region in the plurality of pixel regions, whether the trajectory intersects any pixel in the pixel region; and
indicating, for each pixel region, a result of the determining in a memory location in the searchable code that corresponds to the pixel region.

8. A system for identifying a spatial location of an event within video image data comprising:
at least one processing device;
memory operably associated with the at least one processing device; and
a spatial representation tool storable in memory and executable by the at least one processing device, the spatial representation tool causing the at least one processing device to:
detect an object and obtaining trajectory data of a trajectory of the object within the video image data from a sensor device;
convert the trajectory data into a contour-coded compressed image;
generate, based on the trajectory data, a searchable code that contains a set of locations traversed by the trajectory of the object within the video image;
associate the searchable code with the contour-coded compressed image in a database; and
return, in response to a query having a selected location that corresponds a location of the set of locations in the searchable code, an image of the trajectory data corresponding to the object based on the contour-coded compressed image in the database.

9. The system of claim 8, the spatial representation tool further causing the at least one processing device to search the database to identify a spatial location of the event within the video image data.

10. The system of claim 9, the searching comprising:
converting the area of interest to a lossy query code; and
comparing the lossy query code to the searchable code of the trajectory data within the video image data.

11. The system according to claim 10, the spatial representation tool further causing the at least one processing device to:
decompress the contour-coded compressed image corresponding to the lossy query code based on the comparing; and
plot the trajectory of the trajectory data within the video image data from the contour-coded compressed image.

12. The system according to claim 8, wherein the converting further comprises:
dividing the video image data into a plurality of pixel regions;
determining, for each pixel region in the plurality of pixel regions, whether the trajectory intersects any pixel in the pixel region; and
indicating, for each pixel region, a result of the determining in a memory location in the contour-coded compressed image that corresponds to the pixel region.

13. The system according to claim 12, the converting further comprising:
determining, for each pixel region that the trajectory intersects, a direction of the trajectory from a location in the video image associated with the pixel region; and
assigning a value that indicates the direction of the trajectory from the associated location to the memory location in the contour-coded compressed image that corresponds to each pixel region that the trajectory intersects.

14. The system according to claim 8, wherein the generating further comprises:
dividing the video image data into a plurality of pixel regions;
determining, for each pixel region in the plurality of pixel regions, whether the trajectory intersects any pixel in the pixel region; and
indicating, for each pixel region, a result of the determining in a memory location in the searchable code that corresponds to the pixel region.

15. A computer-readable storage device storing computer instructions, which when executed, enables a computer system to identify a spatial location of an event within video image data, the computer instructions comprising:
detecting an object and obtaining trajectory data of a trajectory of the object within the video image data from a sensor device;
converting the trajectory data into a contour-coded compressed image;
generating, based on the trajectory data, a searchable code that contains a set of locations traversed by the trajectory of the object within the video image;
associating the searchable code with the contour-coded compressed image in a database; and
returning, in response to a query having a selected location that corresponds a location of the set of locations in the searchable code, an image of the trajectory data corresponding to the object based on the contour-coded compressed image in the database.

16. The computer-readable storage device according to claim 15, further comprising computer instructions for searching the database to identify a spatial location of the event within the video image data, the searching comprising:
converting the area of interest to a lossy query code; and
comparing the lossy query code to the searchable code of the trajectory data within the video image data.

17. The computer-readable storage device according to claim 16, further comprising computer instructions for:
- decompressing the contour-coded compressed image corresponding to the lossy query code based on the comparing; and
- plotting the trajectory of the trajectory data within the video image data from the contour-coded compressed image.

18. The computer-readable storage device according to claim 15, wherein the converting further comprises:
- dividing the video image data into a plurality of pixel regions;
- determining, for each pixel region in the plurality of pixel regions, whether the trajectory intersects any pixel in the pixel region; and
- indicating, for each pixel region, a result of the determining in a memory location in the contour-coded compressed image that corresponds to the pixel region.

19. The computer-readable storage device according to claim 18, the converting further comprising:
- determining, for each pixel region that the trajectory intersects, a direction of the trajectory from a location in the video image associated with the pixel region; and
- assigning a value that indicates the direction of the trajectory from the associated location to the memory location in the contour-coded compressed image that corresponds to each pixel region that the trajectory intersects.

20. The computer-readable storage device according to claim 15, wherein the generating further comprises:
- dividing the video image data into a plurality of pixel regions;
- determining, for each pixel region in the plurality of pixel regions, whether the trajectory intersects any pixel in the pixel region; and
- indicating, for each pixel region, a result of the determining in a memory location in the searchable code that corresponds to the pixel region.

* * * * *